(12) United States Patent
Wilson

(10) Patent No.: US 9,200,949 B2
(45) Date of Patent: Dec. 1, 2015

(54) STAND-ALONE PHOTOSENSOR ASSEMBLY

(71) Applicant: Lance J. Wilson, Shaker Heights, OH (US)

(72) Inventor: Lance J. Wilson, Shaker Heights, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 557 days.

(21) Appl. No.: 13/709,425

(22) Filed: Dec. 10, 2012

(65) Prior Publication Data

US 2013/0146774 A1    Jun. 13, 2013

Related U.S. Application Data

(60) Provisional application No. 61/569,607, filed on Dec. 12, 2011.

(51) Int. Cl.
| | | |
|---|---|---|
| *G01T 3/06* | (2006.01) | |
| *G01J 1/04* | (2006.01) | |
| *G01T 7/00* | (2006.01) | |
| *G01J 1/58* | (2006.01) | |

(52) U.S. Cl.
CPC ............... *G01J 1/0403* (2013.01); *G01J 1/58* (2013.01); *G01T 3/06* (2013.01); *G01T 7/00* (2013.01)

(58) Field of Classification Search
CPC ............ G01J 1/0403; G01J 1/58; G01T 3/06; G01T 7/00
See application file for complete search history.

(56) References Cited

U.S. PATENT DOCUMENTS

| | | |
|---|---|---|
| 5,070,249 A | 12/1991 | White |
| 5,229,604 A | 7/1993 | Larson et al. |
| 5,548,116 A | 8/1996 | Pandelisev |
| 5,742,057 A | 4/1998 | Frederick et al. |
| 5,796,109 A | 8/1998 | Frederick et al. |
| 5,962,855 A | 10/1999 | Frederick et al. |
| 6,355,932 B1 | 3/2002 | Frederick |
| 6,545,256 B1 | 4/2003 | Ishizu et al. |
| 7,115,873 B2 | 10/2006 | Medley et al. |
| 7,170,061 B2 | 1/2007 | Clarke et al. |

(Continued)

FOREIGN PATENT DOCUMENTS

EP    2071359 A2    6/2009

OTHER PUBLICATIONS

Search Report, received Nov. 18, 2011, 4 pages.

(Continued)

*Primary Examiner* — Mark R Gaworecki
(74) *Attorney, Agent, or Firm* — Abel Law Group, LLP; Robert N Young

(57) ABSTRACT

A stand-alone photosensor assembly has a housing with an axis, a first axial end and a second axial end opposite the first axial end. An adapter may be threadingly coupled to the first axial end of the housing. The adapter may be adapted to mount the housing to a scintillator. A photosensor element may be located inside the housing and adapted to be optically coupled to the scintillator. A sub-housing may be located inside the housing, at least a portion of which is located radially between the housing and the photosensor element. A scintillator assembly may include a scintillator and the photosensor assembly. A machine, such as a radiation detector, may include the scintillator and the photosensor assembly coupled to the scintillator. The machine also may include an output device to generate output in response to the photosensor assembly, and a user interface coupled to the output device.

28 Claims, 5 Drawing Sheets

(56) References Cited

U.S. PATENT DOCUMENTS

| | | |
|---|---|---|
| 7,381,957 B2 | 6/2008 | Medley et al. |
| 7,485,851 B2 | 2/2009 | Medley et al. |
| 7,485,865 B2 | 2/2009 | Medley et al. |
| 7,507,969 B1 | 3/2009 | Jones et al. |
| 7,626,172 B2 | 12/2009 | Takahashi et al. |
| 2005/0032415 A1 | 2/2005 | Sakamoto |
| 2005/0224717 A1 | 10/2005 | Clarke et al. |
| 2009/0095910 A1 | 4/2009 | Jones et al. |
| 2010/0163735 A1 | 7/2010 | Menge et al. |
| 2010/0193693 A1 | 8/2010 | Jones et al. |
| 2011/0291014 A1 | 12/2011 | Kusner |

OTHER PUBLICATIONS

International Search Report and Written Opinion dated Mar. 19, 2013 with regard to application No. PCT/US2012/068700.

STAND-ALONE PHOTOSENSOR ASSEMBLY

CROSS-REFERENCE TO RELATED APPLICATION

This application claims priority under 35 U.S.C. §119(e) to U.S. Patent Application No. 61/569,607 entitled "Stand-Alone Photosensor Assembly," by Wilson, filed Dec. 12, 2011, which is assigned to the current assignee hereof and incorporated herein by reference in its entirety.

FIELD OF THE DISCLOSURE

The present disclosure is generally related to radiation detectors and, more particularly, to a ruggedized photosensor assembly for a radiation detector.

BACKGROUND

A radiation detector can include a plastic scintillator, such as BC-704™-brand scintillator available from Saint-Gobain Crystals of Hiram, Ohio, USA. The BC-704™-brand scintillator includes alternating layers of wavelength shifting fibers and phosphorescent materials. A light shield is typically attached to each of the scintillators and contains a photosensor, such as a photomultiplier tube (PMT). The PMT is protected from exposure to light by the light shield.

Some security-related operating environments require the PMT to withstand substantial shock, vibration and temperature extremes. Various designs have been attempted for this purpose. Some designs are directly bonded to the scintillators with epoxy. Others bolt onto the scintillators and require additional gaskets and epoxy to form a light-tight seal. The epoxied-on light shield designs use only epoxy to create a seal for the light shield assembly and the internal electronics. These designs are not removable and be difficult to work on if they need maintenance. Moreover, these designs also can fail when subjected to vibration. Accordingly, improved light shield designs continue to be of interest.

SUMMARY

Embodiments of a system, method and apparatus for a stand-alone photosensor assembly are disclosed. The assembly may comprise a housing having an axis, a first axial end and a second axial end opposite the first axial end. An adapter may be threadingly coupled to the first axial end of the housing. The adapter may be adapted to mount the housing to a scintillator. A photosensor element may be located inside the housing and adapted to be optically coupled to the scintillator. A sub-housing may be located inside the housing, at least a portion of which is located radially between the housing and the photosensor element.

In other embodiments, a scintillator assembly may comprise a scintillator and a photosensor assembly as described herein. In still other embodiments, a machine, such as a radiation detector, may comprise a scintillator and a photosensor assembly coupled to the scintillator. The photosensor assembly may comprise the embodiments disclosed herein. The machine may further comprise an output device to generate output in response to the photosensor assembly, and a user interface coupled to the output device.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the drawings is provided to assist in understanding the teachings disclosed herein. The following discussion focuses on specific implementations and embodiments of the teachings. This focus is provided to assist in describing the teachings and should not be interpreted as a limitation on the scope or applicability of the teachings.

Figure 1:
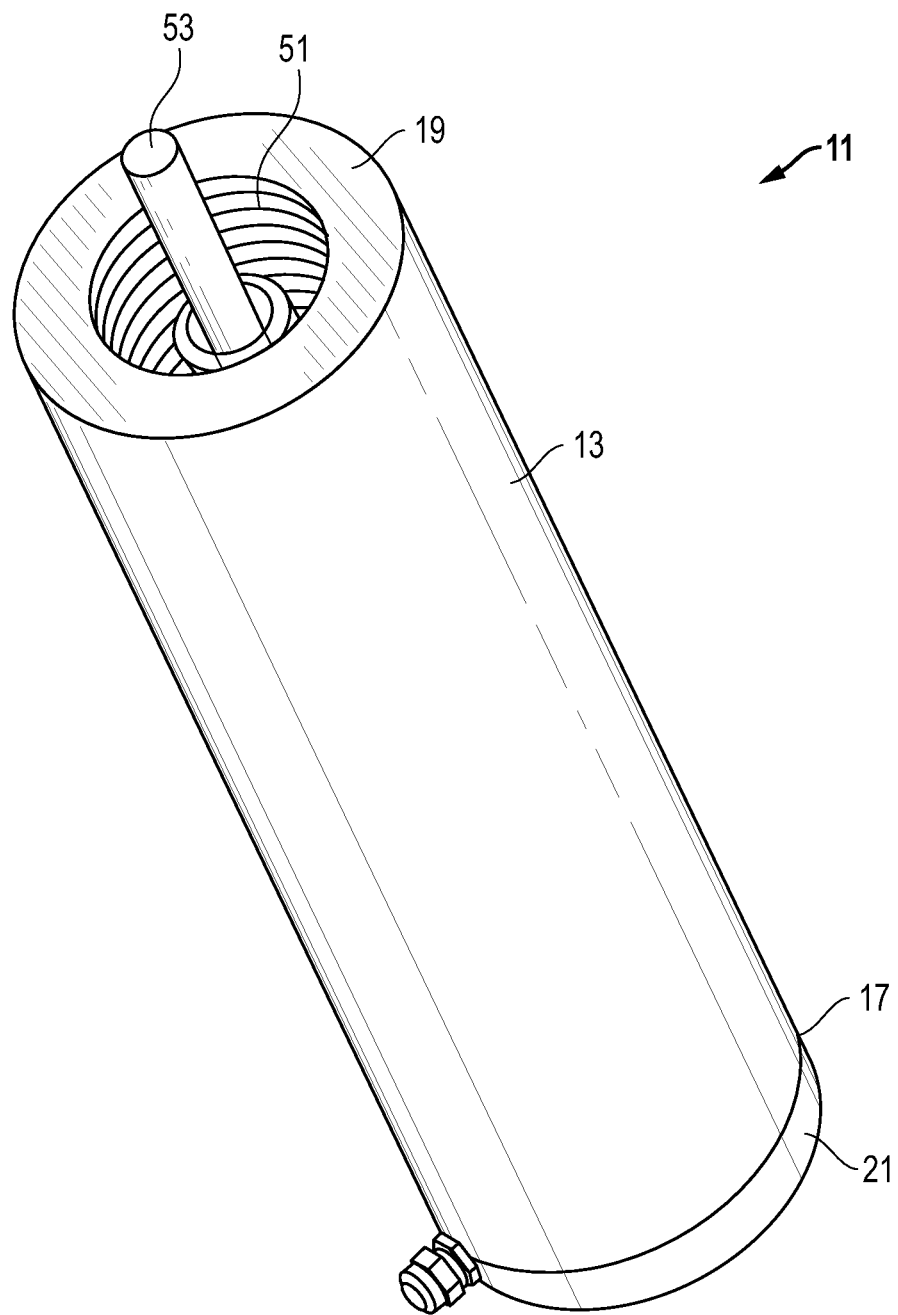
FIGS. 1 and 2 are isometric and sectional side views of an embodiment of a photosensor assembly.
Figure 2:
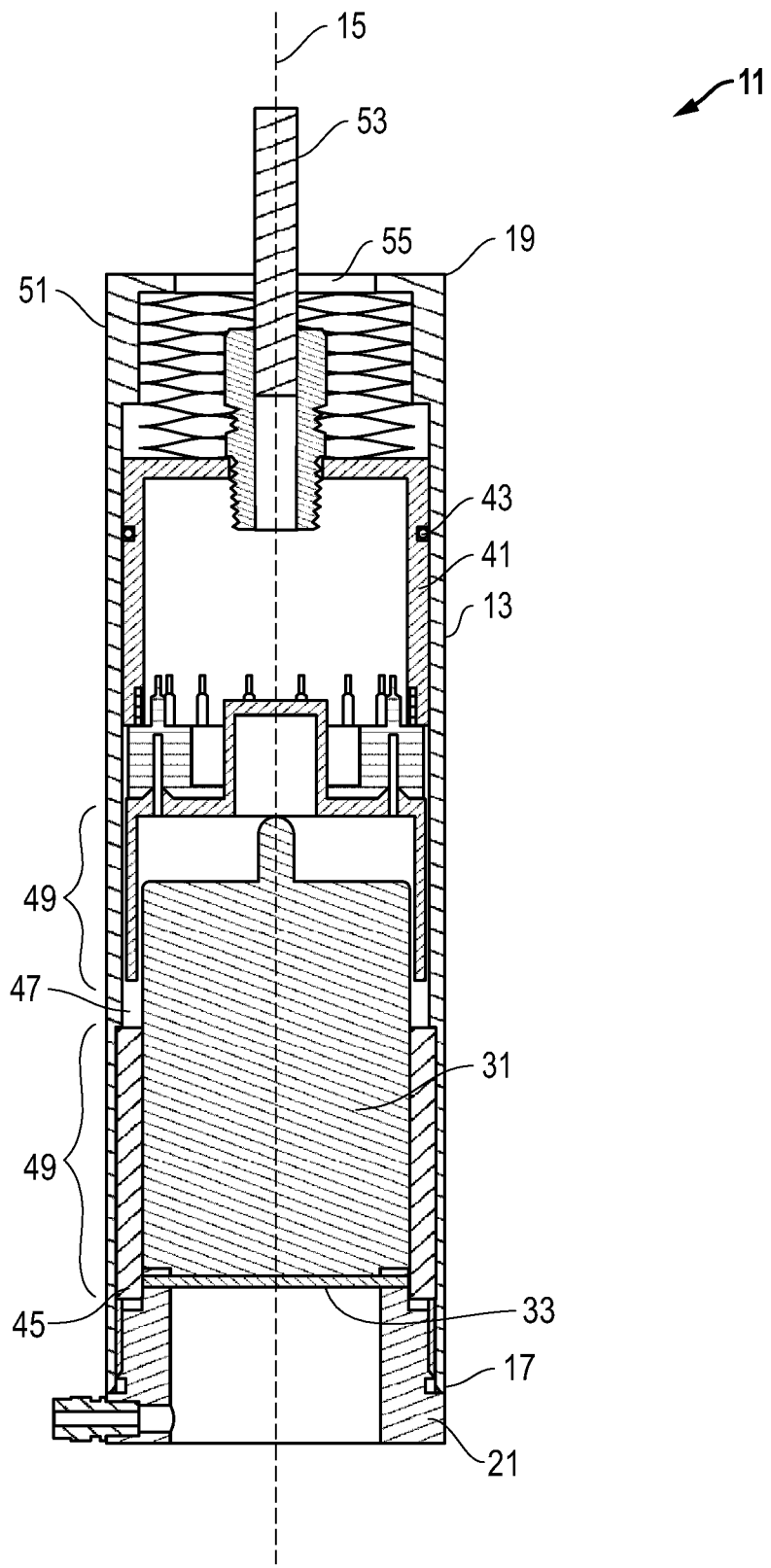

FIGS. 1 and 2 depict a stand-alone photosensor assembly 11. The term "stand-alone," as used herein, means that the photosensor assembly 11 requires no other component to complete its assembly or to render it operative. The photosensor 11 may comprise a housing 13 having an axis 15, a first axial end 17 and a second axial end 19 opposite the first axial end 17.

Figure 3:
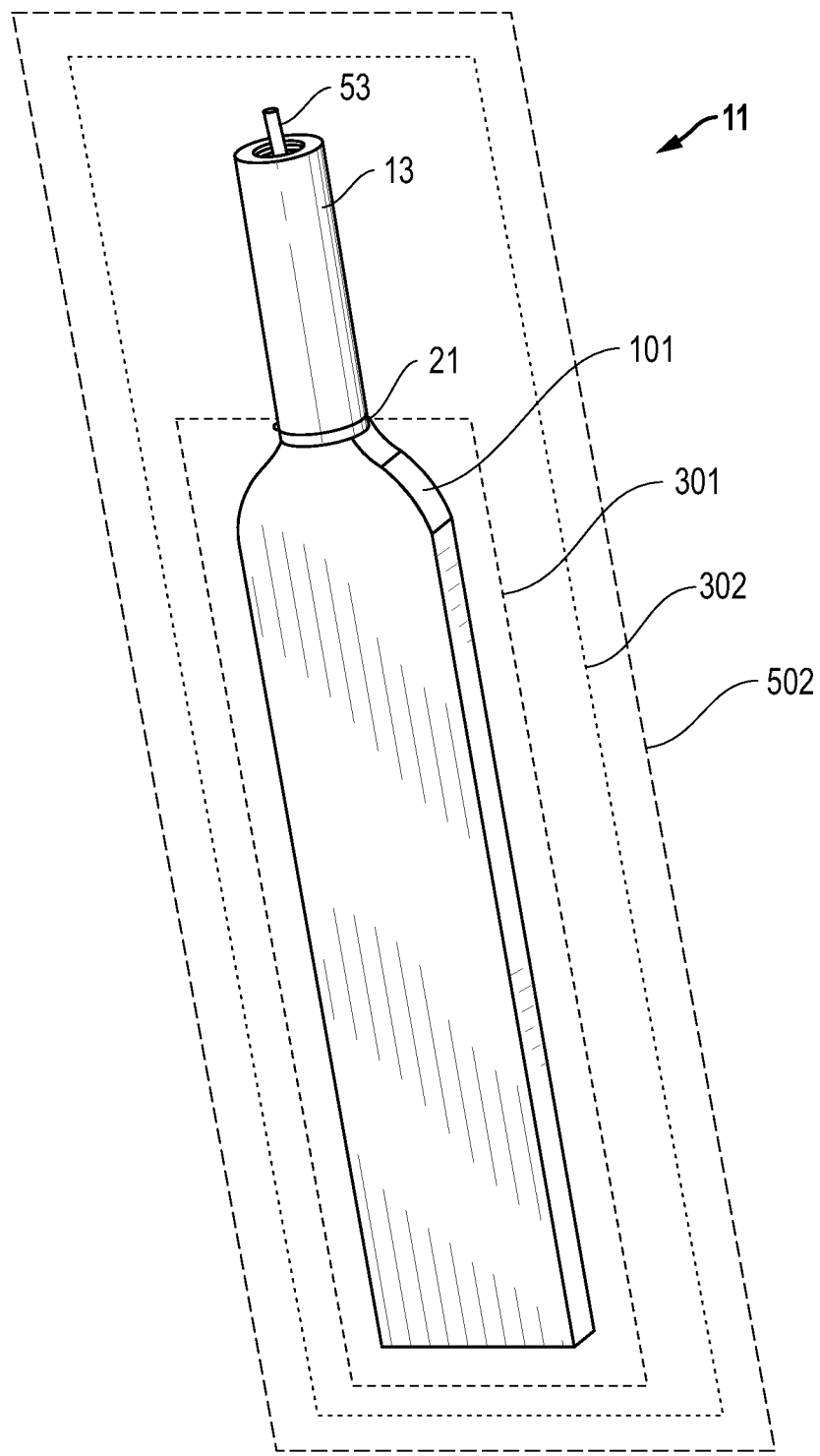
FIGS. 3 and 4 are isometric and partial sectional side views of an embodiment of a photosensor assembly mounted to a scintillator.
Figure 4:
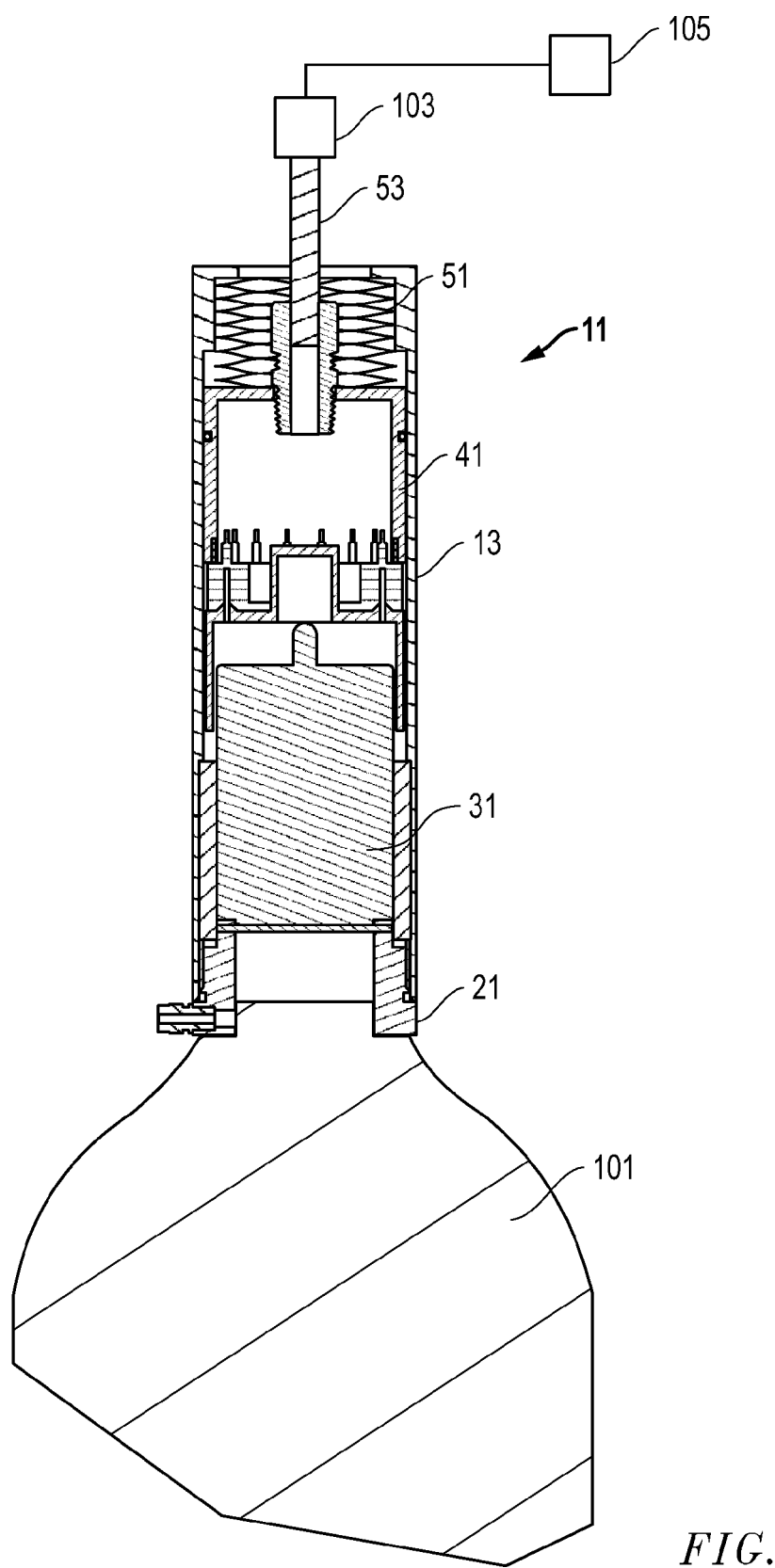

An adapter 21 is threadingly coupled to and, in some embodiments, extends from the first axial end 17 of the housing 13. The adapter 21 may be adapted to mount the housing 13 directly to a scintillator 101, as shown in FIGS. 3 and 4.

The adapter 21 may be provided with an external thread received by an internal thread adjacent the first axial end 17 of the housing 13. The adapter 21 may axially abut an optical pad 33 opposite the photosensor element 31. The adapter 21 may be adapted to be adhesively or mechanically attached to the scintillator 101. The scintillator 101 and the photosensor assembly 11 may be coaxial or not coaxial via adapter 21.

A photosensor element 31 may be located inside the housing 13 and adapted to be optically coupled to the scintillator 101. For example, the photosensor element 31 may be optically coupled to the scintillator 101 using grease and/or the optical pad 33 (FIG. 2). The photosensor element 31 may comprise, for example, a photomultiplier tube (PMT), a photodiode, an avalanche photodiode or a silicon photomultiplier.

The housing 13 may provide magnetic shielding for the photosensor element 31. The housing may include an alloy material, such as aluminum alloys or stainless steel with Mu metal electrically conductive to the base substrate. Mu metal is an alloy that may comprise approximately 77% nickel, 16% iron, 5% copper and 2% chromium or molybdenum, in some versions. Mu metal is notable for its high magnetic permeability. The high permeability makes mu metal very effective at screening static or low frequency magnetic fields, which may not be attenuated by other methods. The name originates from the Greek letter mu (μ) which represents permeability.

A sub-housing 41 also may be located inside the housing 13. At least a portion of the sub-housing 41 may be located radially between the housing 13 and the photosensor element 31. The sub-housing 41 may comprise electronics coupled to the photosensor element 31 for converting input from the photosensor element 31 to an output signal. The sub-housing 41 may comprise a voltage divider, electronics, power supply, pre-amp or a temperature sensor, or any combination thereof.

The sub-housing 41 may be located radially between the housing 13 and at least a portion 49 of the photosensor element 31. The sub-housing 41 may be located axially between the second axial end 19 of the housing 13 and the photosensor element 31.

An annular seal 43, such as one or more o-rings, may be positioned between the sub-housing 41 and the housing 13 to form a light-tight seal adjacent second axial end 19.

The housing 13 may comprise a single integrated component, or two or more components that are coupled together to form light-tight seals therebetween. In an embodiment comprising two components to form housing 13, the two components may connect to each other near the o-ring 43 (e.g., just above o-ring 43 in FIG. 2).

Embodiments may further comprise weather stripping 45 between the photosensor element 31 and the housing 13. An axial space 47 may be provided between the sub-housing 41 and the weatherstripping 45. In some versions, only a portion 49 of the photosensor element 31 is surrounded by the sub-housing 41 and the weatherstripping 45.

The stand-alone photosensor assembly 11 may further comprise a spring 51 inside the housing 13 between the second axial end 19 and the sub-housing 41. The spring 51 may be configured to mechanically bias the sub-housing 41 and the photosensor element 31 away from the second axial end 19 of the housing 13 and maintain electrical continuity therebetween for grounding purposes. The spring 51 may comprise, for example, a wave spring, a die spring, or a wire compression spring with a single turn or multiple turns.

A cable 53 may extend from the electronics, through the sub-housing 41 and the spring 51, and out of an aperture 55 in the second axial end 19 of the housing 13 to transmit the output signal from the electronics to an exterior of the housing 13. The cable 53 may be spaced apart from the aperture 55 as shown. In some embodiments, the photosensor assembly 11 is substantially free of any adhesive compound.

In other embodiments, a scintillator assembly (FIGS. 3 and 4) comprise the scintillator 101 and the photosensor assembly 11 as described herein. The scintillator 101 may comprise, for example, a neutron sensor comprising $^6$LiF or ZnS:(Ag or Cu).

The scintillator 101 also may comprise a gamma radiation sensor, an alpha radiation sensor or a beta radiation sensor. Some gamma sensors may comprise polyvinyl toluene (PVT) or styrene with at least one fluorescent additive. The fluorescent additive may comprise a compound having at least three linearly-connected aromatic rings. The aromatic rings may be homo-aromatic or hetero-aromatic. In some embodiments, the fluorescent additive may comprise p-terphenyl ($C_{18}H_{14}$), 2-(4-Biphenylyl)-5-phenyl-1,3,4-oxadiazole (PBD, or $C_{20}H_{14}N_2O$), butyl PBD ($C_{24}H_{22}N_2O$), 2,5-Diphenyloxazole (PPO, or $C_{15}H_{11}NO$), and a wavelength shifter such as 1,4-bis(5-phenyloxazol-2-yl) benzene (POPOP) ($C_{24}H_{16}N_2O$).

In still other embodiments, a machine such as radiation detector may comprise the scintillator 101, a photosensor assembly 11 coupled to the scintillator 101 as described herein, an output device 103 (FIG. 4) to generate output in response to the photosensor assembly 11, and a user interface 105 coupled to the output device.

Some scintillators comprise organic devices formed from organic compounds that are not hydroscopic. Such compounds may be configured with an inorganic liner or shell, such as plastic. The designs disclosed herein are well suited for mounting optical fiber bundles.

Figure 5:
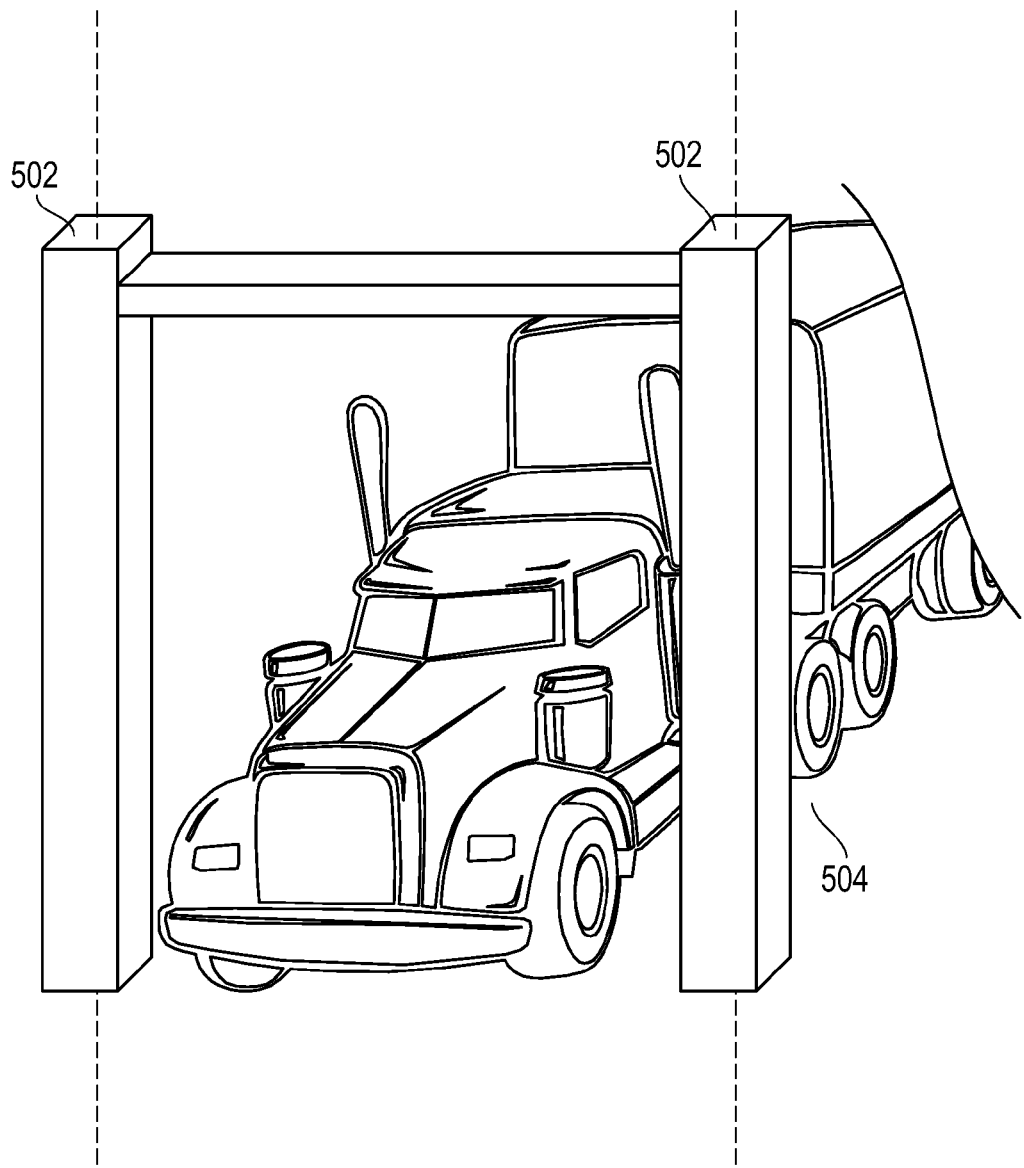
FIG. 5 is a perspective view of an embodiment of a "port-of-entry" radiation detection apparatus in operation.

In operation (FIG. 5), an object 504 can be placed near or pass through an opening within a machine or radiation detection apparatus 502, such as a port-of-entry radiation detector. Radiation detection apparatus 502 may be configured with the various embodiments disclosed herein. The object 504 may be a vehicle such as a truck. The radiation detection apparatus 502 can capture at least part of the targeted radiation emitted by the object 504. The radiation sensors can emit scintillating light or wavelength shifted light that is converted to an electronic signal by the photosensors. The electronic signal can be transmitted to a control module (not illustrated) for further analysis.

In some embodiments (FIG. 3), the scintillator 101 may be located in a second housing 301 that is separate from the housing 13 of the photosensor assembly 11. In addition, a moderator box 303 may contain the photo sensor assembly 11 and the scintillator 101. The photosensor assembly 11 may comprise at least two photosensor assemblies 11, both of which are located in the moderator box 303. Some embodiments further comprise a weatherproof enclosure 502 (FIGS. 3 and 5) in which the moderator box 303 is located.

The embodiments disclosed herein have numerous advantages. No epoxy or other adhesive is used to form the light-tight seal inside of the light shield assembly. Conventional designs require epoxy to be applied to the seams of their light shields to prevent light leaks.

The threaded adapter design disclosed not only allows for easy removal of the light shield assembly, but creates a more reliable, light tight seal. The threaded adapter used in the embodiments disclosed herein helps form a light-tight seal inside of the light shield. In addition, the adapter also allows for easy removal of the light shield assembly from the scintillating element of the detector. The adapter may be modified to fit almost any detector manufactured.

The threaded adapter attaches to the scintillator by gluing the scintillator or light guide inside of the adapter. The rest of the light shield assembly is simply threaded tight onto the adapter creating a secure, light-tight fit. No epoxy is used to secure the adapter to the light shield assembly, thus making removal and replacement very easy.

The addition of an o-ring to the design adds ruggedness and additional radial support. Minimizing the allowable movement of internal electrical components increases the accuracy of the assembly. The integrated O-Ring, applied weather stripping, and wave spring give this assembly excellent vibration protection by preventing the PMT and other electronics from hitting the light shield wall in both the axial and lateral directions.

Conventional epoxy designs fail at about 2 g's of random vibration. In contrast, the embodiments disclosed herein perform well when subjected to more than 2 g's of force, more than 2.5 g's of force, more than 3 g's of force, or more than 3.5 g's of force. Thus, these designs can withstand and operate in g-forces in excess of 2.

In some embodiments, the pressure applied by the wave spring on the electronic components is approximately 12.5 pounds. This pressure assists the o-ring and the weather stripping in preventing internal movement and further ruggedizes the assembly. Advantageously, the spring is electrically conductive to maintain electrical continuity between the housing and the electronics or voltage divider.

The integrated o-ring, along with the threads connecting the light shield to the adapter, form a light-tight environment that prevents the PMT from outputting false readings due to light leaks.

An additional benefit of this design is the greatly simplified and minimal manufacturing time required to complete the assembly. The photosensor assembly itself requires to bonding or adhesive and thus no cure time. In some embodiments, only the adapter is adhesively bonded or mechanically joined to the scintillator. Thus, the assembly is completed in a few minutes, rather than days as required by conventional designs because of the cure times associated with the bonding materials needed to complete those types of assemblies.

In addition, the spring between the housing and the voltage divider maintains electrical continuity within the assembly. Thus, this design requires no grounding strap as is required by some conventional designs.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A stand-alone photosensor assembly, comprising:
a housing having an axis, a first axial end and a second axial end opposite the first axial end;
an adapter threadingly coupled to the first axial end of the housing, the adapter being adapted to mount the housing to a scintillator;
a photosensor element inside the housing adapted to be optically coupled to the scintillator; and
a sub-housing inside the housing, at least a portion of which is located radially between the housing and the photosensor element.

2. A stand-alone photosensor assembly according to claim 1, further comprising an annular seal between the sub-housing and the housing.

3. A stand-alone photosensor assembly according to claim 1, further comprising a spring inside the housing between the second axial end of the housing and the sub-housing, the spring being configured to mechanically bias the sub-housing and the photosensor element away from the second axial end of the housing and maintain electrical continuity therebetween.

4. A stand-alone photosensor assembly according to claim 1, wherein the adapter has an external thread received by an internal thread on the first axial end of the housing, the adapter axially abuts an optical pad opposite the photosensor element, and the adapter is adapted to be adhesively or mechanically attached to the scintillator.

5. A stand-alone photosensor assembly according to claim 1, wherein the sub-housing comprises electronics coupled to the photosensor element for converting input from the photosensor element to an output signal.

6. A stand-alone photosensor assembly according to claim 1, wherein the housing provides magnetic shielding for the photosensor element.

7. A stand-alone photosensor assembly according to claim 1, further comprising weather stripping between the photosensor element and the housing.

8. A stand-alone photosensor assembly according to claim 1, wherein the photosensor element comprises a photomultiplier tube (PMT), and the sub-housing comprises a voltage divider, electronics, power supply, pre-amp, temperature sensor or any combination thereof.

9. A stand-alone photosensor assembly according to claim 1, wherein the sub-housing is located radially between the housing and at least a portion of the photosensor element, and the sub-housing is located axially between the second axial end of the housing and the photosensor element.

10. A stand-alone photosensor assembly according to claim 1, wherein the photosensor assembly is substantially free of any adhesive compound.

11. A stand-alone photosensor assembly according to claim 1, wherein the housing comprises two or more components joined together to form light-tight seals therebetween.

12. A scintillator assembly, comprising:
a scintillator; and
a photosensor assembly comprising:
a housing having an axis, a first axial end and a second axial end opposite the first axial end;

an adapter threadingly coupled to the first axial end of the housing, the adapter being adapted to mount the housing to a scintillator;

a photosensor element inside the housing adapted to be optically coupled to the scintillator; and a sub-housing inside the housing, at least a portion of which is located radially between the housing and the photosensor element.

13. A scintillator assembly according to claim 12, wherein the scintillator is located in a second housing that is separate from the housing of the photosensor assembly.

14. A scintillator assembly according to claim 12, wherein the scintillator is a neutron sensor comprising $^6$LiF or ZnS:(Ag or Cu).

15. A scintillator assembly according to claim 12, further comprising an annular seal between the sub-housing and the housing.

16. A scintillator assembly according to claim 15, further comprising weather stripping axially disposed between the adapter and the annular seal.

17. A scintillator assembly according to claim 12, wherein the adapter has an external thread received by an internal thread on the first axial end of the housing, the adapter axially abuts an optical pad opposite the photosensor element, and the adapter is adapted to be adhesively or mechanically attached to the scintillator.

18. A scintillator assembly according to claim 12, wherein the sub-housing comprises electronics coupled to the photosensor element for converting input from the photosensor element to an output signal.

19. A scintillator assembly according to claim 12, wherein the sub-housing is located radially between the housing and at least a portion of the photosensor element, and the sub-housing is located axially between the second axial end of the housing and the photosensor element.

20. A scintillator assembly according to claim 12, wherein the photosensor assembly is substantially free of any adhesive compound.

21. A scintillator assembly according to claim 12, wherein the housing comprises two or more components joined together to form light-tight seals therebetween.

22. A scintillator assembly according to claim 12, wherein the photosensor assembly is configured to withstand and operate in a g-force in excess of 2.

23. A machine, comprising:
a scintillator;
a photosensor assembly coupled to the scintillator, the photosensor assembly comprising:
a housing having an axis, a first axial end and a second axial end opposite the first axial end;
an adapter threadingly coupled to the first axial end of the housing, the adapter being adapted to mount the housing to a scintillator;
a photosensor element inside the housing adapted to be optically coupled to the scintillator; and
a sub-housing inside the housing, at least a portion of which is located radially between the housing and the photosensor element; and the machine further comprising:
an output device to generate output in response to the photosensor assembly; and
a user interface coupled to the output device.

24. A machine according to claim 23, wherein the scintillator is located in a second housing that is separate from the housing of the photosensor assembly.

25. A machine according to claim 23, wherein the scintillator is a neutron sensor comprising $^6$LiF or ZnS:(Ag or Cu).

26. A machine according to claim 23, further comprising a spring inside the housing between the second axial end of the housing and the sub-housing, the spring being configured to mechanically bias the sub-housing and the photosensor element away from the second axial end of the housing and maintain electrical continuity therebetween.

27. A machine according to claim 23, wherein the adapter has an external thread received by an internal thread on the first axial end of the housing, the adapter axially abuts an optical pad opposite the photosensor element, and the adapter is adapted to be adhesively or mechanically attached to the scintillator.

28. A machine according to claim 23, wherein the sub-housing comprises electronics coupled to the photosensor element for converting input from the photosensor element to an output signal.

\* \* \* \* \*